E. STEUER.
PROCESS FOR TREATING SLUDGE.
APPLICATION FILED FEB. 12, 1912.
1,071,367.
Patented Aug. 26, 1913.
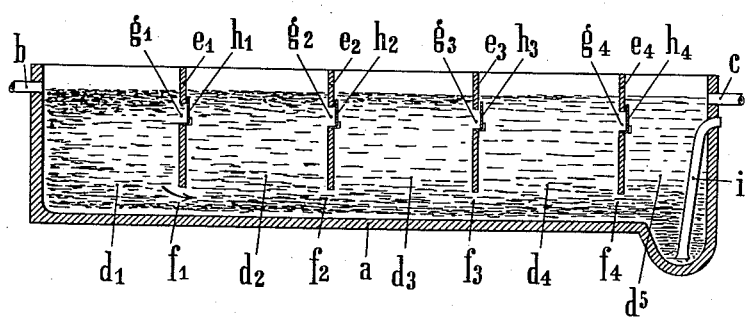

UNITED STATES PATENT OFFICE.

EUGEN STEUER, OF NEUSTADT-ON-THE-HARDT, GERMANY.

PROCESS FOR TREATING SLUDGE.

1,071,367.   Specification of Letters Patent.   Patented Aug. 26, 1913.

Application filed February 12, 1912. Serial No. 677,196.

*To all whom it may concern:*

Be it known that I, EUGEN STEUER, a citizen of Germany, residing at Neustadt-on-the-Hardt, in the Palatinate, Bavaria, Germany, have invented certain new and useful Improvements in Processes for Treating Sludge, of which the following is a specification.

This invention relates to the treatment of sludge, and has for its purpose the production of a homogeneously putrefied sludge.

The invention consists in such a treating of the sludge entering the sludge tank that the fresh sludge is subjected on the bottom of the tank to lateral displacement in such a manner that it is not hindered to undergo the natural movements of putrefied fermentation. In this way the several portions of sludge contained in the tank which are in different stages of fermentation do not materially interfere with each other and each portion may finish its process of fermentation without being materially intermixed with portions of sludge in a different stage of fermentation.

The lateral displacement of the sludge on the substantially horizontal bottom of the tank without hindering the natural movements of fermentation can be obtained in a simple manner by providing the tank with partitions which extend upwardly above the level of the sludge and which downwardly reach to a point near the tank bottom. In such a tank the sludge wanders through the slit openings which are formed between the lower edge of the partitions and the bottom of the tank from one end of the tank to the other. The fresh sludge which is introduced into the first chamber of the tank shifts the sludge contained therein through the slit near the bottom of the tank below the edge of the first partition into the second chamber and so on finally to the exit of the tank.

The invention may be carried out readily in the apparatus shown in the accompanying drawing, the figure representing a longitudinal section through the tank employed.

The tank as a whole is designated with the numeral $a$. It is provided with an inlet $b$ and an outlet $c$. The tank is divided into a plurality of chambers $d'$ to $d^5$ by partitions $e'$ to $e^4$. The partitions $e$ extend over the upper level of the tank filling and are arranged with their lower edges at a distance from the bottom of the tank so that slit openings $f'$ to $f^4$ are formed. The partitions $e$ are provided at a point above the slits $f$ and below the level of the sludge filling of the chamber with passages $g'$ to $g^4$ with closing devices $h'$ to $h^4$ respectively.

$i$ is the sludge removal pipe.

The operation of the device is as follows: The fresh sludge is introduced into the chamber $d'$ of the tank $a$ and quickly undergoes therein fermentation. On each introduction of a new portion of sludge the bottom portions of the sludge which are already in fermentation are shifted by the new sludge portion deposited thereon through slit $f'$ into chamber $d^2$. At the same time the sludge portion which is shifted over into chamber $d^2$ shifts the sludge contained in this chamber which is already in a stage of advanced fermentation through slit $f^2$ into chamber $d^3$. In the same way the sludge contained in each of the several chambers is shifted by the sludge entering such chamber from the preceding chamber into the next chamber till at last it arrives in chamber $d^5$ from where it is removed through pipe $i$. The lateral displacement of the sludge within the tank takes place while the passages $g$ of the partitions $e$ are closed by the closing devices $h$. In this way the displacement of the sludge is effected by the higher head of slimy liquid existing in each preceding chamber of the tank with relation to the following chamber. In all the chambers of the tank through which the sludge is wandering successively the sludge particles undergo fermentation and are kept in up and down movement by the generation of gas connected with said fermentation. When the sludge enters the last chamber $d^5$ the fermentation process is substantially finished. During the fermentation process a separating out of water from the sludge takes place. Such water is drawn off through exit pipe $c$. For this purpose the closing devices $h$ of the partitions $e$ are intermittently opened. The sludge which leaves the tank through pipe $i$ is homogeneously putrefied and free or nearly free of particles which are still liable to fermentation. The homogeneously putrefied sludge may be dried or subjected to any desired other treatment which requires sludge which no more is liable to fermentation.

What I claim is:

1. Process for producing uniformly decomposed sludge in sludge tanks consisting therein that the sludge is shifted on the bottom of the tank from one end of the tank to the other by the fresh sludge introduced substantially without intermixing sludge portions of different stages of fermentation with each other and without hindering all the sludge portions to undergo within the tank the movements connected to the fermentation process.

2. Process for producing uniformly decomposed sludge in sludge tanks, consisting in shifting the sludge on the bottom of the tank from one end of the tank to the other, by periodically introducing portions of fresh sludge substantially without intermixing sludge portions of different stages of fermentation with each other, and without hindering the fermentation of all the sludge portions within the tank, and removing the clear water separated off from the sludge during fermentation and standing within the tank above the bottom layer of sludge.

In testimony whereof I affix my signature in presence of two witnesses.

EUGEN STEUER.

Witnesses:
KARL FREYTAG,
JULIUS KIBY.